(12) United States Patent
Yonemura et al.

(10) Patent No.: US 9,804,469 B2
(45) Date of Patent: Oct. 31, 2017

(54) LIQUID CRYSTAL PANEL, LIQUID CRYSTAL DISPLAY DEVICE INCLUDING LIQUID CRYSTAL PANEL, AND METHOD OF MANUFACTURING LIQUID CRYSTAL PANEL

(71) Applicant: Mitsubishi Electric Corporation, Tokyo (JP)

(72) Inventors: Koji Yonemura, Tokyo (JP); Hiroshi Umeda, Tokyo (JP); Kazunori Okumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 70 days.

(21) Appl. No.: 14/850,482

(22) Filed: Sep. 10, 2015

(65) Prior Publication Data
US 2016/0091762 A1   Mar. 31, 2016

(30) Foreign Application Priority Data

Sep. 26, 2014   (JP) ................. 2014-195953

(51) Int. Cl.
| | | |
|---|---|---|
| G02F 1/1343 | (2006.01) |
| H01L 27/12 | (2006.01) |
| G02F 1/1335 | (2006.01) |
| G02F 1/1333 | (2006.01) |
| G02F 1/1368 | (2006.01) |
| G02F 1/13363 | (2006.01) |

(Continued)

(52) U.S. Cl.
CPC ...... *G02F 1/1393* (2013.01); *G02F 1/133634* (2013.01); *G02F 1/133707* (2013.01); *G02F 2001/133531* (2013.01); *G02F 2001/133749* (2013.01); *G02F 2001/133773* (2013.01); *G02F 2001/134372* (2013.01)

(58) Field of Classification Search
None
See application file for complete search history.

(56) References Cited

U.S. PATENT DOCUMENTS

| | | | |
|---|---|---|---|
| 2004/0254716 A1 | 12/2004 | Ino et al. | |
| 2009/0115940 A1* | 5/2009 | Ito ................... | G02B 5/3016 349/96 |

(Continued)

FOREIGN PATENT DOCUMENTS

| | | |
|---|---|---|
| JP | H04338732 A | 11/1992 |
| JP | 2003-087688 A | 3/2003 |
| JP | 2007-047204 A | 2/2007 |

*Primary Examiner* — Ashok Patel
(74) *Attorney, Agent, or Firm* — Studebaker & Brackett PC

(57) ABSTRACT

A pretilt angle of a liquid crystal molecule on the side of an array substrate is formed such that the liquid crystal molecule goes away from the array substrate in a direction to the left when viewed from a position facing a display surface of a liquid crystal panel. The pretilt angle on the side of a counter substrate is formed such that the liquid crystal molecule goes away from the counter substrate in a direction to the right when viewed from a position facing the display surface. The directions to the left and the right define a direction X corresponding to a horizontal direction of the liquid crystal panel. A direction of a delay phase axis of a biaxial phase difference film is arranged in a position rotated anticlockwise in an angular range from over 0° to 1° from the direction X.

6 Claims, 10 Drawing Sheets

(51) Int. Cl.
*G02F 1/139* (2006.01)
*G02F 1/1337* (2006.01)

(56) References Cited

U.S. PATENT DOCUMENTS

| | | | | |
|---|---|---|---|---|
| 2009/0174846 A1* | 7/2009 | Ito | ............. | G02B 5/305 349/96 |
| 2014/0327862 A1* | 11/2014 | Hatsusaka | ......... | C09K 19/0225 349/100 |

* cited by examiner

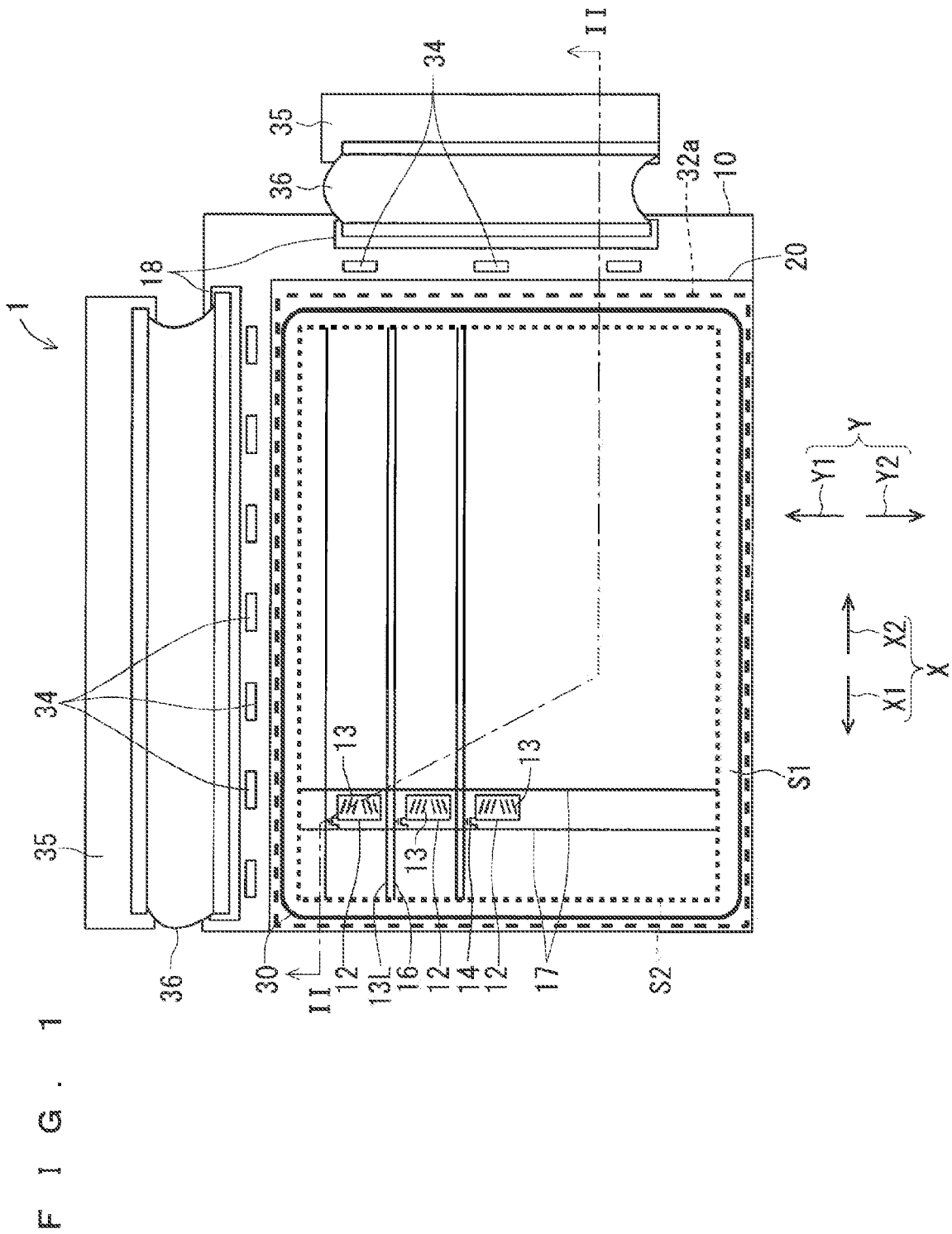

F I G . 4
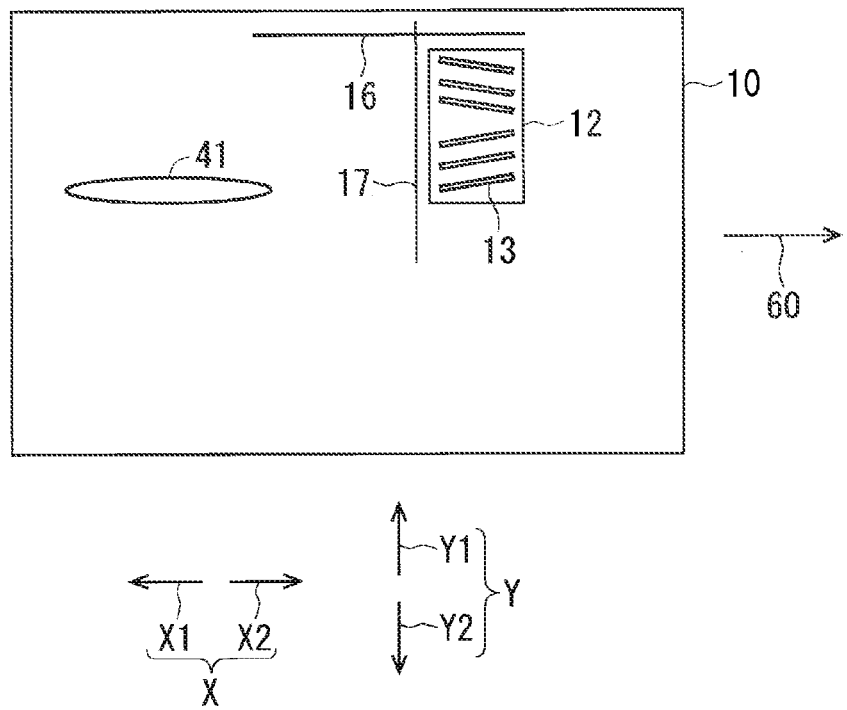

F I G. 5
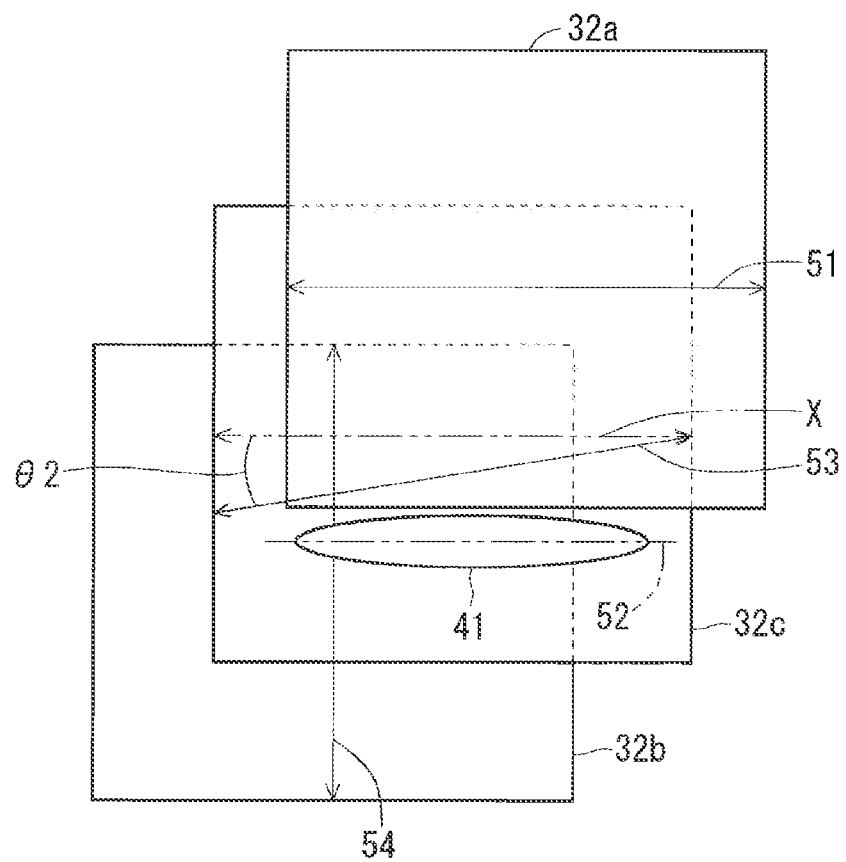

F I G . 9
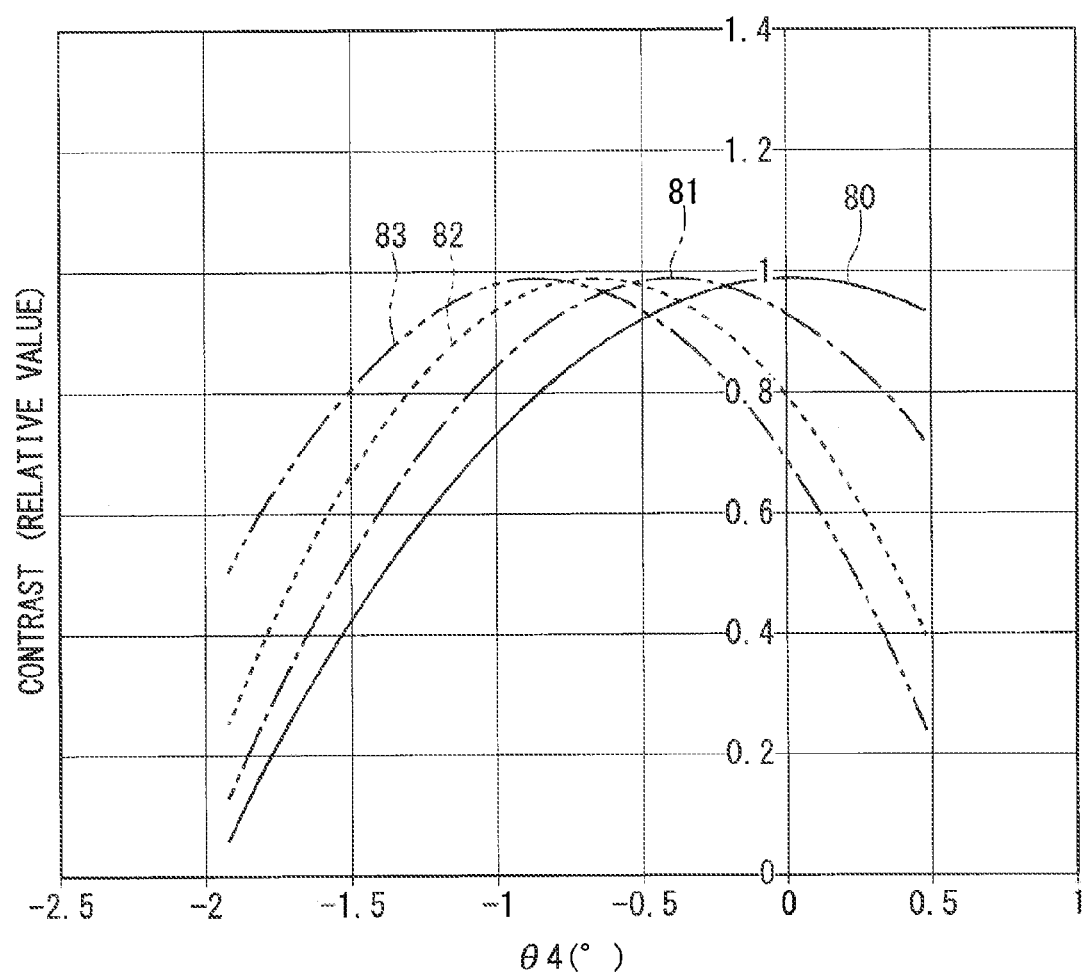

F I G . 1 1
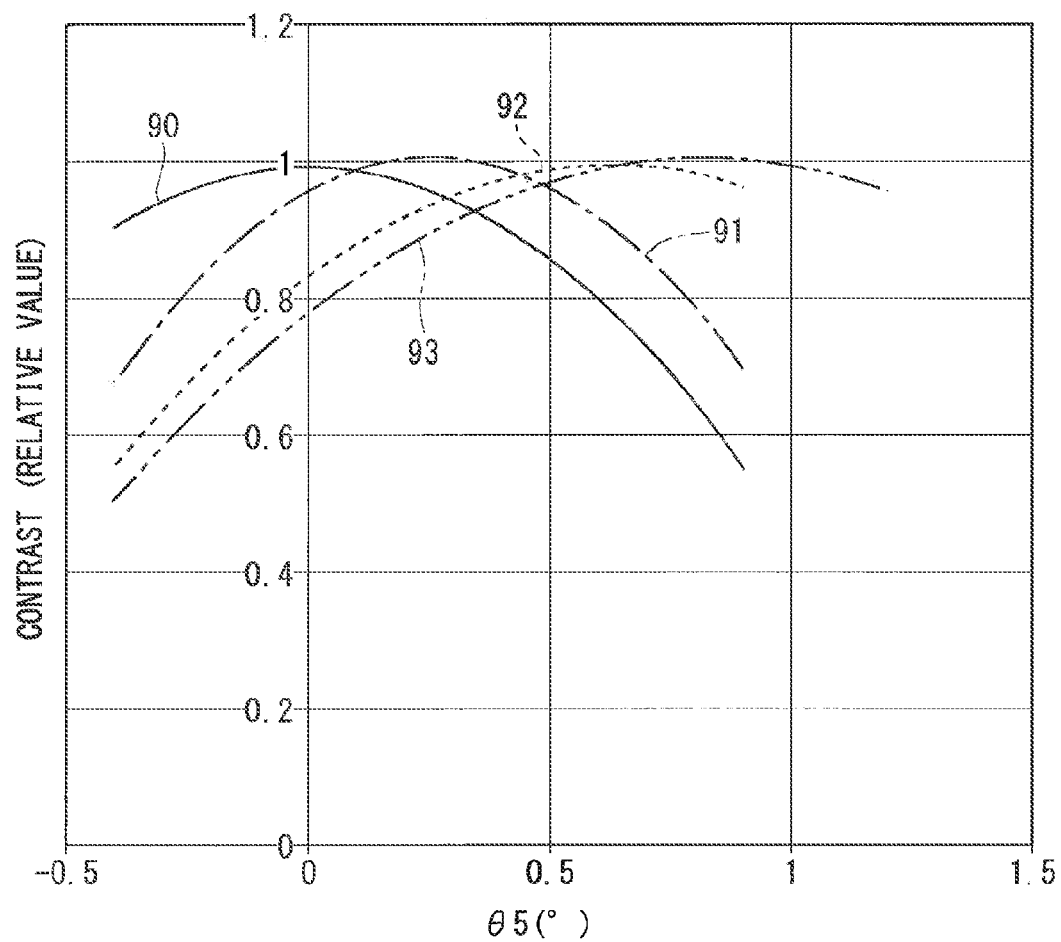

LIQUID CRYSTAL PANEL, LIQUID CRYSTAL DISPLAY DEVICE INCLUDING LIQUID CRYSTAL PANEL, AND METHOD OF MANUFACTURING LIQUID CRYSTAL PANEL

BACKGROUND OF THE INVENTION

Field of the Invention

The present invention relates to a liquid crystal panel, a liquid crystal display device including the liquid crystal panel, and a method of manufacturing the liquid crystal panel.

Description of the Background Art

A liquid crystal display device is used for example as a display device of a car navigation system to be installed on a vehicle, for example. The liquid crystal display device installed on a vehicle is viewed from a driver's seat or a front passenger's seat, so that it is inevitably viewed from above. Thus, regarding the liquid crystal display device to be installed on a vehicle, adjusting a viewing angle range is required so as to optimize optical characteristics such as contrast characteristics when the liquid crystal display device is viewed from above.

A technique of adjusting a viewing angle of a liquid crystal display device in a range preferable for a device to be installed on a vehicle is disclosed in Japanese Patent Application Laid-Open Nos. 4-338732 (1992), 2003-87688, and 2007-47204, for example.

Japanese Patent Application Laid-Open No. 4-338732 (1992) discloses a twisted nematic (abbreviated as TN) liquid crystal display element characterized in that a twist angle of a liquid crystal is set from 70° to 88°, a phase difference (retardation) of a liquid crystal cell is set from 0.30 to 0.38 µm, and an angle of an alignment direction of the liquid crystal relative to a polarization axis of a polarizing plate is set from 0° to 10° or from 90° to 100°.

Japanese Patent Application Laid-Open No. 2003-87688 discloses setting brightness or contrast to vary by about 20 dB (ten times) or less in each of a range from the center to the right to an angle of about 40° and a range from the center to the left to an angle of about 40° with the intention of optimizing visibility from a driver's seat and a front passenger's seat with a liquid crystal display device arranged in the center of the front side of the inside of a vehicle. Japanese Patent Application Laid-Open No. 2003-87688 also discloses setting brightness or contrast to be reduced by about −20 dB or more in each of a range from the center to the right to an angle of about 40° or more and a range from the center to the left to an angle of about 40° or more with the intention of preventing reflection of a displayed image in right front door glass and left front door glass.

Japanese Patent Application Laid-Open No. 2007-47204 discloses a liquid crystal display device with a polarizing reflection plate arranged between a backlight unit and an array substrate. The polarizing reflection plate includes an isotropic medium layer made of an isotropic medium and an anisotropic medium layer stacked on the isotropic medium layer and having refractive index anisotropy. The anisotropic medium layer is made of an optically uniaxial medium. An average direction of the optical axis of the anisotropic medium layer is tilted from a direction of a normal to the polarizing reflection plate and a plane direction of the polarizing reflection plate.

As described above, the techniques of Japanese Patent Application Laid-Open Nos. 4-338732 (1992) and 2003-87688 are to optimize a viewing angle range of a liquid crystal display device in two directions, a direction to the right and a direction to the left. The technique of Japanese Patent Application Laid-Open No. 2007-47204 is to filter display light to be emitted upward with the intention of preventing reflection of the light in an upward direction and a downward direction of the liquid crystal display device, particularly reflection of the light in a windshield.

A liquid crystal display device to be installed on a vehicle is required to achieve a high level both in reducing power consumption in consideration of installation on an electric vehicle and making high-quality display with excellent brightness and contrast characteristics. This brings about an increasing need to optimize visibility in a direction slightly above a direction toward the front of a liquid crystal panel, particularly visibility at a viewing angle of about 20° that is to be satisfied at the expense of degradation of visibility for example from a lower side not used as an actual viewing position inside a vehicle. Thus, the techniques disclosed in Japanese Patent Application Laid-Open Nos. 4-338732 (1992), 2003-87688, and 2007-47204 leave room for improvement.

Like the techniques disclosed in Japanese Patent Application Laid-Open Nos. 2003-87688 and 2007-47204, simply adding an optical component such as a polarizing plate or a wave plate to a liquid crystal panel for filtering or changing an optical path brings about the following problems.

As an example, adding an optical component to cause filtering action brings about the problem of reduction in efficiency of use of light. Adding an optical component not to cause filtering action does not bring about the problem of reduction in efficiency of use of light but it brings about the problem of cost increase.

According to a method of compensating for a viewing angle using a phase difference film as a wave plate, failing to make a delay phase axis of the phase difference film as designed due to manufacturing variations or the like results in a deviation from intended optical compensation. This brings about a problem such as a large deviation of a viewing angle from a range preferable for a liquid crystal display device to be installed on a vehicle.

A liquid crystal display device of a fringe field switching (FFS) system as one of the systems of liquid crystal display devices achieves relatively high efficiency of use of light and a relatively wide viewing angle range. Thus, the FFS liquid crystal display device has been installed in more vehicles. The FFS liquid crystal display device of a conventional technique inherently provides a wide viewing angle range. Thus, a viewing angle has not been optimized by being adjusted finely in a range preferable for a liquid crystal display device to be installed on a vehicle.

SUMMARY OF THE INVENTION

It is an object of the present invention to provide a liquid crystal panel, a liquid crystal display device including the liquid crystal panel, and a method of manufacturing the liquid crystal panel capable of achieving preferable viewing angle characteristics when the liquid crystal panel is viewed from a driver's seat or a front passenger's seat of a vehicle even in the presence of manufacturing variations.

A liquid crystal panel of the present invention includes an array substrate, a counter substrate arranged to face the array substrate, and a liquid crystal layer interposed between the array substrate and the counter substrate. The array substrate includes multiple switching elements arranged in a matrix, a pixel electrode connected to the switching elements, and a counter electrode capable of forming a fringe electric field between the counter electrode and the pixel electrode. The switching elements, the pixel electrode, and the counter electrode are provided on an insulating substrate.

One of the pixel electrode and the counter electrode is formed as a slit electrode having a slit portion and the other of the pixel electrode and the counter electrode is stacked over the slit electrode at the insulating substrate side with respect to the slit electrode with an insulating film interposed therebetween.

The array substrate includes a biaxial phase difference film and an array substrate polarizing plate arranged in this order on a surface of the insulating substrate opposite a side thereof facing the liquid crystal layer.

The counter substrate includes a counter substrate polarizing plate arranged on a side of the counter substrate opposite a side thereof facing the liquid crystal layer.

The slit portion of the slit electrode extends in a direction forming an angle exceeding 0° and not exceeding 15° relative to a horizontal direction of the liquid crystal panel in use.

A pretilt angle of a liquid crystal molecule forming the liquid crystal layer on the side of the array substrate is formed such that the liquid crystal molecule goes away from the array substrate in a direction to the left when viewed from a position facing a display surface of the liquid crystal panel. The direction to the left defines the horizontal direction. The pretilt angle of the liquid crystal molecule on the side of the counter substrate is formed such that the liquid crystal molecule goes away from the counter substrate in a direction to the right when viewed from a position facing the display surface of the liquid crystal panel. The direction to the right defines the horizontal direction.

One of a direction of a delay phase axis of the biaxial phase difference film and a direction of an absorption axis of the array substrate polarizing plate is arranged in a position rotated anticlockwise in an angular range from over 0° to 1° from the horizontal direction. Alternatively, one of a direction of an absorption axis of the counter substrate polarizing plate and an alignment direction of the liquid crystal molecule is arranged in a position rotated clockwise in an angular range from over 0° to 1° from the horizontal direction.

The liquid crystal panel of the present invention is capable of achieving excellent visibility of the liquid crystal panel when the display surface of the liquid crystal panel is viewed from above. Further, degradation of visibility can be suppressed that is to occur in the presence of manufacturing variations in any of the delay phase axis of the biaxial phase difference film, the respective absorption axes of the array substrate polarizing plate and the counter substrate polarizing plate, and the alignment direction of the liquid crystal molecule. As a result, the resultant liquid crystal panel is capable of achieving preferable viewing angle characteristics when the liquid crystal panel is viewed from a driver's seat or a front passenger's seat of a vehicle even in the presence of manufacturing variations.

A liquid crystal panel of the present invention includes an array substrate, a counter substrate arranged to face the array substrate, and a liquid crystal layer interposed between the array substrate and the counter substrate. The array substrate includes multiple switching elements arranged in a matrix, a pixel electrode connected to the switching elements, and a counter electrode capable of forming a fringe electric field between the counter electrode and the pixel electrode. The switching elements, the pixel electrode, and the counter electrode are provided on an insulating substrate.

One of the pixel electrode and the counter electrode is formed as a slit electrode having a slit portion and the other of the pixel electrode and the counter electrode is stacked over the slit electrode at the insulating substrate side with respect to the slit electrode with an insulating film interposed therebetween.

The array substrate includes a biaxial phase difference film and an array substrate polarizing plate arranged in this order on a surface of the insulating substrate opposite a side thereof facing the liquid crystal layer.

The counter substrate includes a counter substrate polarizing plate arranged on a side of the counter substrate opposite a side thereof facing the liquid crystal layer.

The slit portion of the slit electrode extends in a direction forming an angle exceeding 0° and not exceeding 15° relative to a horizontal direction of the liquid crystal panel in use.

A pretilt angle of a liquid crystal molecule forming the liquid crystal layer on the side of the array substrate is formed such that the liquid crystal molecule goes away from the array substrate in a direction to the right when viewed from a position facing a display surface of the liquid crystal panel. The direction to the right defines the horizontal direction. The pretilt angle of the liquid crystal molecule on the side of the counter substrate is formed such that the liquid crystal molecule goes away from the counter substrate in a direction to the left when viewed from a position facing the display surface of the liquid crystal panel. The direction to the left defines the horizontal direction.

One of a direction of a delay phase axis of the biaxial phase difference film and a direction of an absorption axis of the array substrate polarizing plate is arranged in a position rotated clockwise in an angular range from over 0° to 1° from the horizontal direction. Alternatively, one of a direction of an absorption axis of the counter substrate polarizing plate and an alignment direction of the liquid crystal molecule is arranged in a position rotated anticlockwise in an angular range from over 0° to 1° from the horizontal direction.

The liquid crystal panel of the present invention is capable of achieving excellent visibility of the liquid crystal panel when the display surface of the liquid crystal panel is viewed from above. Further, degradation of visibility can be suppressed that is to occur in the presence of manufacturing variations in any of the delay phase axis of the biaxial phase difference film, the respective absorption axes of the array substrate polarizing plate and the counter substrate polarizing plate, and the alignment direction of the liquid crystal molecule. As a result, the resultant liquid crystal panel is capable of achieving preferable viewing angle characteristics when the liquid crystal panel is viewed from a driver's seat or a front passenger's seat of a vehicle even in the presence of manufacturing variations.

A liquid crystal display device of the present invention includes the liquid crystal panel and an illumination unit to illuminate the liquid crystal panel.

The liquid crystal display device of the present invention is capable of achieving preferable viewing angle characteristics when the liquid crystal display device is viewed from a driver's seat or a front passenger's seat of a vehicle even in the presence of manufacturing variations in the liquid crystal panel.

A method of manufacturing a liquid crystal panel of the present invention is to manufacture a liquid crystal panel including an array substrate, a counter substrate arranged to face the array substrate, and a liquid crystal layer interposed between the array substrate and the counter substrate. The array substrate includes multiple switching elements arranged in a matrix, a pixel electrode connected to the switching elements, and a counter electrode capable of forming a fringe electric field between the counter electrode and the pixel electrode. The switching elements, the pixel electrode, and the counter electrode are provided on an insulating substrate.

The method includes the following steps.

A step of forming one of the pixel electrode and the counter electrode as a slit electrode having a slit portion and stacking the other of the pixel electrode and the counter electrode over the slit electrode at the insulating substrate side with respect to the slit electrode interposing an insulating film therebetween.

A step of providing a biaxial phase difference film and an array substrate polarizing plate in this order on a surface of the insulating substrate of the array substrate opposite a side thereof facing the liquid crystal layer.

A step of providing a counter substrate polarizing plate on a side of the counter substrate opposite a side thereof facing the liquid crystal layer.

A step of forming the slit electrode such that the slit portion extends in a direction forming an angle exceeding 0° and not exceeding 15° relative to a horizontal direction of the liquid crystal panel in use.

A step of setting a pretilt angle of a liquid crystal molecule forming the liquid crystal layer on the side of the array substrate such that the liquid crystal molecule goes away from the array substrate in a direction to the left when viewed from a position facing a display surface of the liquid crystal panel, the direction to the left defining the horizontal direction, and setting the pretilt angle of the liquid crystal molecule on the side of the counter substrate such that the liquid crystal molecule goes away from the counter substrate in a direction to the right when viewed from a position facing the display surface of the liquid crystal panel, the direction to the right defining the horizontal direction.

A step of arranging one of a direction of a delay phase axis of the biaxial phase difference film and a direction of an absorption axis of the array substrate polarizing plate in a position rotated anticlockwise in an angular range from over 0° to 1° from the horizontal direction or arranging one of a direction of an absorption axis of the counter substrate polarizing plate and an alignment direction of the liquid crystal molecule in a position rotated clockwise in an angular range from over 0° to 1° from the horizontal direction.

The method of manufacturing a liquid crystal panel of the present invention provides a liquid crystal panel capable of achieving preferable viewing angle characteristics when the liquid crystal panel is viewed from a driver's seat or a front passenger's seat of a vehicle even in the presence of manufacturing variations.

A method of manufacturing a liquid crystal panel of the present invention is to manufacture a liquid crystal panel including an array substrate, a counter substrate arranged to face the array substrate, and a liquid crystal layer interposed between the array substrate and the counter substrate. The array substrate includes multiple switching elements arranged in a matrix, a pixel electrode connected to the switching elements, and a counter electrode capable of forming a fringe electric field between the counter electrode and the pixel electrode. The switching elements, the pixel electrode, and the counter electrode are provided on an insulating substrate.

The method includes the following steps.

A step of forming one of the pixel electrode and the counter electrode as a slit electrode having a slit portion and stacking the other of the pixel electrode and the counter electrode over the slit electrode at the insulating substrate side with respect to the slit electrode interposing an insulating film therebetween.

A step of providing a biaxial phase difference film and an array substrate polarizing plate in this order on a surface of the insulating substrate of the array substrate opposite a side thereof facing the liquid crystal layer.

A step of providing a counter substrate polarizing plate on a side of the counter substrate opposite a side thereof facing the liquid crystal layer.

A step of forming the slit electrode such that the slit portion extends in a direction forming an angle exceeding 0° and not exceeding 15° relative to a horizontal direction of the liquid crystal panel in use.

A step of setting a pretilt angle of a liquid crystal molecule forming the liquid crystal layer on the side of the array substrate such that the liquid crystal molecule goes away from the array substrate in a direction to the right when viewed from a position facing a display surface of the liquid crystal panel, the direction to the right defining the horizontal direction, and setting the pretilt angle of the liquid crystal molecule on the side of the counter substrate such that the liquid crystal molecule goes away from the counter substrate in a direction to the left when viewed from a position facing the display surface of the liquid crystal panel, the direction to the left defining the horizontal direction.

A step of arranging one of a direction of a delay phase axis of the biaxial phase difference film and a direction of an absorption axis of the array substrate polarizing plate in a position rotated clockwise in an angular range from over 0° to 1° from the horizontal direction or arranging one of a direction of an absorption axis of the counter substrate polarizing plate and an alignment direction of the liquid crystal molecule in a position rotated anticlockwise in an angular range from over 0° to 1° from the horizontal direction.

The method of manufacturing a liquid crystal panel of the present invention provides a liquid crystal panel capable of achieving preferable viewing angle characteristics when the liquid crystal panel is viewed from a driver's seat or a front passenger's seat of a vehicle even in the presence of manufacturing variations.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing the structure of a liquid crystal panel 1 provided in a liquid crystal display device according to a first preferred embodiment of the present invention;

FIG. 4 is a plan view showing an example of the position of an array substrate 10 and that of a liquid crystal molecule 41 relative to each other in the first preferred embodiment of the present invention;

FIG. 5 shows an example of arrangement of optical components of the liquid crystal panel 1 according to the first preferred embodiment of the present invention;

FIG. 9 is a graph showing a relationship between an angle θ4 of an alignment axis 52 of the liquid crystal molecule 41 to the direction X and a contrast value determined in a direction of the polar angle θ3 at an azimuth of 90°;

FIG. 11 is a graph showing a relationship between an angle θ5 of an absorption axis 51 of a counter substrate polarizing plate 32a to the direction X and a contrast value determined in a direction of the polar angle θ3 at an azimuth of 90°.

DESCRIPTION OF THE PREFERRED EMBODIMENTS

<First Preferred Embodiment>

Figure 2:
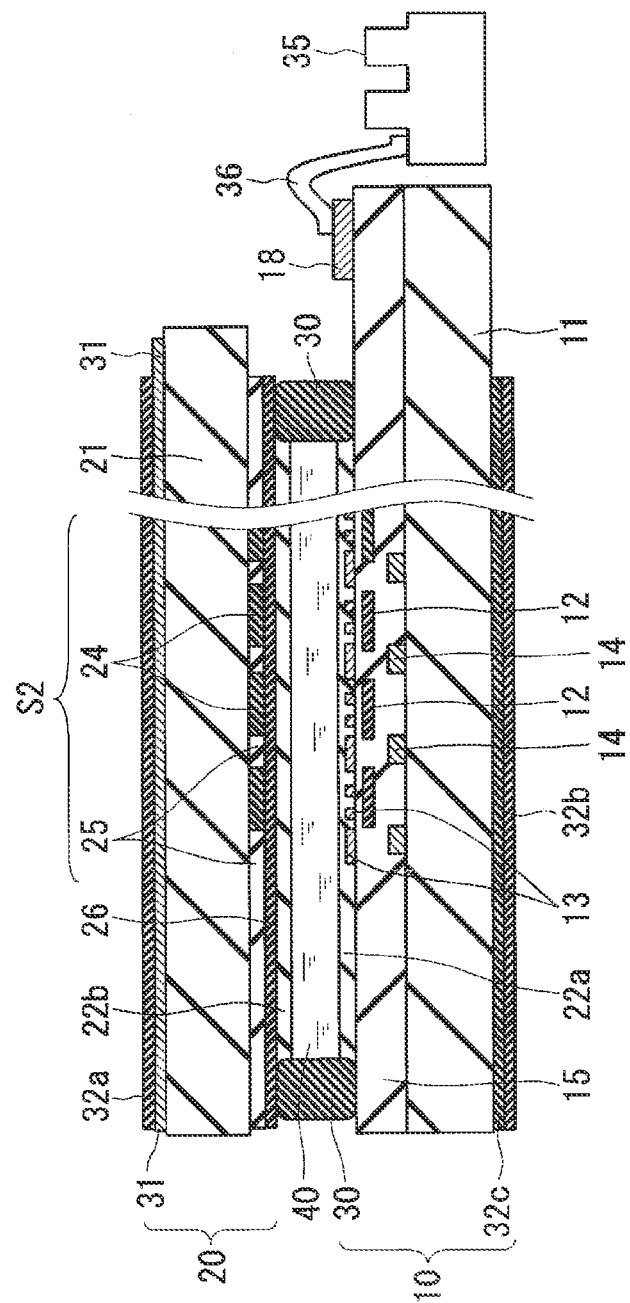
FIG. 2 is a sectional view of the liquid crystal panel 1 as viewed from a cutting plane line II-II of FIG. 1.

FIG. 1 is a plan view showing the structure of a liquid crystal panel 1 provided in a liquid crystal display device according to a first preferred embodiment of the present invention. FIG. 2 is a sectional view of the liquid crystal panel 1 as viewed from a cutting plane line II-II of FIG. 1.

The liquid crystal panel 1 shown as an example in FIGS. 1 and 2 adopts an in-plane system operated by using a thin film transistor (abbreviated as TFT) as a switching element. The liquid crystal panel 1 is more specifically a liquid crystal panel adopting a fringe field switching (FFS) system.

As shown in FIGS. 1 and 2, the liquid crystal panel 1 includes a TFT array substrate (simply called an "array substrate" in some cases) 10, a color filter substrate 20, and a seal material 30.

Both the array substrate 10 and the color filter substrate 20 are quadrilateral, more specifically rectangular in outer shape. In the first preferred embodiment, the outer shape of the array substrate 10 is larger than that of the color filter substrate 20. The array substrate 10 has a protrusion protruding from an end surface of the outer circumference of the color filter substrate 20. The array substrate 10 is superposed over the color filter substrate 20. The array substrate 10 and the color filter substrate 20 are superposed such that one of the short sides of the array substrate 10 and that of the color filter substrate 20 are aligned with each other, one of the long sides of the array substrate 10 and that of the color filter substrate 20 are aligned with each other, and one of the corners of the array substrate 10 and that of the color filter substrate 20 are aligned with each other.

In the below, a direction of the long sides of the array substrate 10 and that of the long sides of the color filter substrate 20 are called a direction X. A direction of the short sides of the array substrate 10 and that of the short sides of the color filter substrate 20 are called a direction Y. The directions X and Y are perpendicular to each other. In FIG. 1, the direction X includes a direction to the right and a direction to the left in the plane of the sheet. The direction Y includes an upward direction and a downward direction in the plane of the sheet.

One of the directions defining the direction X is called a direction X1 and the other direction is called a direction X2. One of the directions defining the direction Y is called a direction Y1 and the other direction is called a direction Y2. The direction X1 mentioned herein is a direction from the right toward the left in the plane of the sheet of FIG. 1. The direction X2 mentioned herein is a direction from the left toward the right in the plane of the sheet of FIG. 1. The direction Y1 mentioned herein is an upward direction in the plane of the sheet of FIG. 1. The direction Y2 mentioned herein is a downward direction in the plane of the sheet of FIG. 1. In terms of the time on a clock, each direction of FIG. 1 is expressed as follows: the direction X1 is at the 9 o'clock position, the direction X2 is at the 3 o'clock position, the direction Y1 is at the 0 o'clock position, and the direction Y2 is at the 6 o'clock position.

The array substrate 10 includes TFTs 14 as switching elements arranged in a matrix. The color filter substrate 20 is a counter substrate aligned so as to face the array substrate 10. The color filter substrate 20 has a display region S2 where images are to be displayed. The seal material 30 is arranged so as to surround a region corresponding to the display region S2. The seal material 30 hermetically closes a gap between the color filter substrate 20 and the array substrate 10.

A large number of columnar spacers not shown in the drawings are arranged in the display region S2 between the array substrate 10 and the color filter substrate 20. The columnar spacers form and maintain the gap of a constant distance between the array substrate 10 and the color filter substrate 20.

The gap between the color filter substrate 20 and the array substrate 10 hermetically closed by the seal material 30 and maintained by the columnar spacers includes a region which corresponds at least to the display region S2 and in which a liquid crystal layer 40 is interposed. The seal material 30 is arranged in a frame region S1 external to the region corresponding to the display region S2.

The "display region S2" mentioned herein is a region to be used for display extending over the array substrate 10, extending over the color filter substrate 20, or interposed between the array substrate 10 and the color filter substrate 20 of the liquid crystal panel 1.

The "frame region S1" is a region of a configuration like a frame external to the display region S2 and surrounding the display region S2. The frame region S1 extends over the array substrate 10, extends over the color filter substrate 20, or is interposed between the substrates 10 and 20 of the liquid crystal panel 1. In the first preferred embodiment, the frame region S1 is a residual region determined by subtracting the display region S2 from the entire region over the array substrate 10, over the color filter substrate 20, or interposed between the substrates 10 and 20 of the liquid crystal panel 1. The color filter substrate 20 includes a glass substrate 21 as a first transparent substrate, an alignment film 22b for alignment of a liquid crystal, color filters 24 in a colorant layer, a light shielding layer 25, and an overcoat layer 26.

The alignment film 22b is provided in a region corresponding to the display region S2 and extending over one of surfaces of the glass substrate 21 in the thickness direction thereof. The color filters 24, the light shielding layer 25, and the overcoat layer 26 are provided between the alignment film 22b and the glass substrate 21. The light shielding layer 25 is provided to shield space between the color filters 24 from light or to shield the frame region S1 arranged externally to a region corresponding to the display region S2 from light. The overcoat layer 26 is provided so as to cover the color filters 24 and the light shielding layer 25.

The color filters 24 are formed of colorant layers containing a pigment dispersed in resin, for example. The color filters 24 function as filters to selectively let light pass through that may be red, green, or blue light in a particular wavelength range. The color filters 24 are formed of the colorant layers of these colors arranged regularly.

The light shielding layer 25 is made of a metallic material using chrome oxide or the like or a resin-based material containing black particles dispersed in resin, for example. In the first preferred embodiment, as shown in FIG. 2, the overcoat layer 26 formed of a transparent resin film is provided at a shorter distance to the glass substrate 21 than the alignment film 22b. The overcoat layer 26 is provided so as to cover and flatten the color filters 24 and the light shielding layer 25.

The color filter substrate 20 includes an antistatic transparent conductive layer 31 provided on the other of the surfaces of the glass substrate 21 in the thickness direction thereof. The antistatic transparent conductive layer 31 is ground-connected. The antistatic transparent conductive layer 31 is provided so as to cover the glass substrate 21 at least in the display region S2. In the liquid crystal panel 1 of an in-plane system of the first preferred embodiment, the antistatic transparent conductive layer 31 is provided to effectively prevent a display failure due to an electrostatically charged state and application of an external electric field.

The array substrate 10 includes a glass substrate 11 as a second transparent substrate, an alignment film 22a for alignment of a liquid crystal, a pixel electrode 12, a counter electrode 13, the TFTs 14, an insulating film 15, multiple gate lines 16 and multiple source lines 17, and gate electrodes, source electrodes, and drain electrodes not shown in the drawings.

The alignment film 22a is provided on a surface of the glass substrate 11 facing the color filter substrate 20 and in a region corresponding to the display region S2. The pixel electrode 12 and the counter electrode 13 are each provided at a shorter distance to the glass substrate 11 than the alignment film 22a. The pixel electrode 12 and the counter electrode 13 form an electrode pair to generate an electric field in a direction parallel to a substrate surface of the array substrate 10 or the color filter substrate 20, thereby generating a voltage to drive a liquid crystal.

The TFTs 14 are switching elements to write a voltage to the pixel electrode 12 as one of the electrode pair. The TFTs 14 are connected to the pixel electrode 12 and apply a voltage to the pixel electrode 12. The TFTs 14 are covered with the insulating film 15.

The gate lines 16 and the source lines 17 are to supply signals to the TFTs 14. The gate lines 16 are connected to the gate electrodes of the TFTs 14. The source lines 17 are connected to the source electrodes or gate electrodes of the TFTs 14.

In the first preferred embodiment, the pixel electrode 12 and the counter electrode 13 forming the electrode pair to apply a voltage to drive a liquid crystal are configured as follows. The pixel electrode 12 as one of the electrode pair is formed of a transparent conductive film pattern of a flat plate configuration. The counter electrode 13 as the other of the electrode pair is formed of a transparent conductive film pattern of a comb-like configuration or a transparent conductive film pattern with multiple opening portions like slits arranged in parallel. The counter electrode 13 is superposed over the pixel electrode 12 while an insulating layer is held between the counter electrode 13 and the pixel electrode 12.

In the below, an electrode like the counter electrode 13 formed of a transparent conductive film pattern of a comb-like configuration or a transparent conductive film pattern with multiple opening portions like slits arranged in parallel is called a "slit electrode" in some cases. An electrode portion of the transparent conductive film pattern of a comb-like configuration and the multiple opening portions like slits of the transparent conductive film pattern with these opening portions like slits are called a "slit portion" in some cases.

The respective configurations of the pixel electrode 12 and the counter electrode 13 are not limited to those described above. As an example, the respective configurations of the pixel electrode 12 and the counter electrode 13 and the arrangement of the pixel electrode 12 and the counter electrode 13 in terms of their positions in a vertical direction may be reversed from those of the first preferred embodiment.

In this case, the pixel electrode 12 is formed as a slit electrode. More specifically, the pixel electrode 12 is formed of a transparent conductive film pattern of a comb-like configuration or a transparent conductive film pattern with multiple opening portions like slits arranged in parallel. The pixel electrode 12 is placed in a higher position than the counter electrode 13. The counter electrode 13 is formed of a transparent conductive film pattern of a flat plate configuration and is placed in a lower position than the pixel electrode 12.

A specific planar pattern configuration of the pixel electrode 12 and that of the counter electrode 13 are not shown in the drawings and will not be described. The pixel electrode 12 and the counter electrode 13 may have respective planar pattern configurations of a pixel electrode and a counter electrode used in a liquid crystal panel adopting a publicly-known FFS system.

An insulating film of the first preferred embodiment including the insulating film 15 forming the array substrate 10 and the insulating film not shown in the drawings formed between the pixel electrode 12 and the counter electrode 13 is formed of a single-layer transparent insulating film or a stacked film with transparent insulating films stacked in multiple layers.

As shown in outline in FIG. 1, the multiple gate lines 16 formed in the display region S2 are arranged parallel to each other. Likewise, the multiple source lines 17 are arranged parallel to each other in the display region S2. The gate lines 16 and the source lines 17 cross each other.

The pixel electrodes 12 and the TFTs 14 are arranged in a matrix in a corresponding relationship with regions each surrounded by the gate lines 16 and the source lines 17 crossing each other (hereinafter called a "pixel region" in some cases). In the first preferred embodiment, one pixel electrode 12 and one TFT 14 are provided in one pixel region.

Common lines 13L through which a common potential is to be supplied to the counter electrode 13 extend parallel to the gate lines 16. The number of the common lines 13L is the same as that of the gate lines 16. Each common line 13L is connected to the counter electrode 13 in a corresponding pixel region and standardizes each potential of the counter electrode 13 in each pixel region at a common potential.

A signal terminal 18 is provided in the frame region S1 over the array substrate 10 and on a surface of the protrusion protruding from the end surface of the outer circumference of the color filter substrate 20. This surface of the protrusion belongs to a side where the color filter substrate 20 is arranged. The signal terminal 18 receives a signal to be supplied to the TFT 14 from outside and applies the received signal to the TFT 14.

The signal terminal 18 is shown as an integrated configuration in FIGS. 1 and 2. The signal terminal 18 is actually configured as follows. Quadrilateral pads each having a longitudinal side extending in a direction perpendicular to a neighboring substrate end side are formed to be spaced from each other so as to be responsive to multiple signals. A large number of signal terminals 18 are arranged in the direction of the short side of each pad.

Each pad of the signal terminal 18 is connected to a control substrate 35 through a flexible flat cable (abbreviated as FFC) 36 functioning as a connection line. The control substrate 35 includes a control integrated circuit (IC) chip to generate a control signal or the like to control a driver IC, for example.

The control signal from the control substrate 35 is input through the signal terminal 18 to an input side of a driver IC chip 34 attached to the protrusion. An output signal to be output from an output side of the driver IC chip 34 is supplied to the TFTs 14 in the display region S2 through a large number of signal leading lines pulled out from the display region S2.

The color filter substrate 20 as the counter substrate includes a counter substrate polarizing plate 32a provided in a layer on the antistatic transparent conductive layer 31 provided on an external surface relative to the liquid crystal layer 40.

The array substrate 10 includes an array substrate polarizing plate 32b and a biaxial phase difference film 32c provided on a surface of the glass substrate 11 opposite a side thereof facing the liquid crystal layer 40, specifically on an external surface of the glass substrate 11. The biaxial phase difference film 32c is provided on the surface of the glass substrate 11 opposite the side thereof facing the liquid crystal layer 40, specifically on the external surface of the glass substrate 11. The array substrate polarizing plate 32b is arranged external to the biaxial phase difference film 32c and stacked on the biaxial phase difference film 32c. Specifically, the biaxial phase difference film 32c and the array substrate polarizing plate 32b are stacked in this order on the glass substrate 11.

The counter substrate polarizing plate 32a, the array substrate polarizing plate 32b, and the biaxial phase difference film 32c are provided so as to cover at least the display region S2 of the color filter substrate 20 and the array substrate 10.

A particular optical design, a method of setting an optical axis, and a manufacturing method about each of the counter substrate polarizing plate 32a, the array substrate polarizing plate 32b, and the biaxial phase difference film 32c are described later.

The antistatic transparent conductive film 31 formed on the surface of the color filter substrate 20 is ground-connected. As an example, in the first preferred embodiment, an earth pad not shown in the drawings is provided to the protrusion of the array substrate 10. The antistatic transparent conductive layer 31 and the earth pad are connected through a conductive tape not shown in the drawings. This connects the antistatic transparent conductive layer 31 to the ground.

The antistatic transparent conductive layer 31 is mostly covered with the counter substrate polarizing plate 32a. The antistatic transparent conductive layer 31 has an exposed part not covered with the counter substrate polarizing plate 32a to be partially exposed at an end portion of the color filter substrate 20. The conductive tape is connected to the antistatic transparent conductive layer 31 by being attached to the exposed part of the antistatic transparent conductive layer 31.

The liquid crystal display device of the first preferred embodiment includes the liquid crystal panel 1 of the aforementioned structure, a backlight unit not shown in the drawings, an optical sheet not shown in the drawings, and a case not shown in the drawings. The backlight unit corresponds to an illumination unit.

The backlight unit is arranged on a side opposite a display surface formed in the display region S2 of the color filter substrate 20 while the optical sheet is placed between the liquid crystal panel 1 and the backlight unit. The backlight unit faces the substrate surface of the array substrate 10 to function as a light source. The optical sheet has the function of adjusting light from the backlight unit (hereinafter called "backlighting light" in some cases).

The case has a configuration with a portion through which the display surface of the display region S2 is opened. The liquid crystal display device includes the liquid crystal panel 1 and optical components including the aforementioned backlight unit and optical sheet accommodated together in the case.

The following describes a particular structure, more specifically an optical design and advantageous effects achieved by the design relating to each of the counter substrate polarizing plate 32a, the array substrate polarizing plate 32b, and the biaxial phase difference film 32c. A prerequisite technique is explained first.

Figure 3:
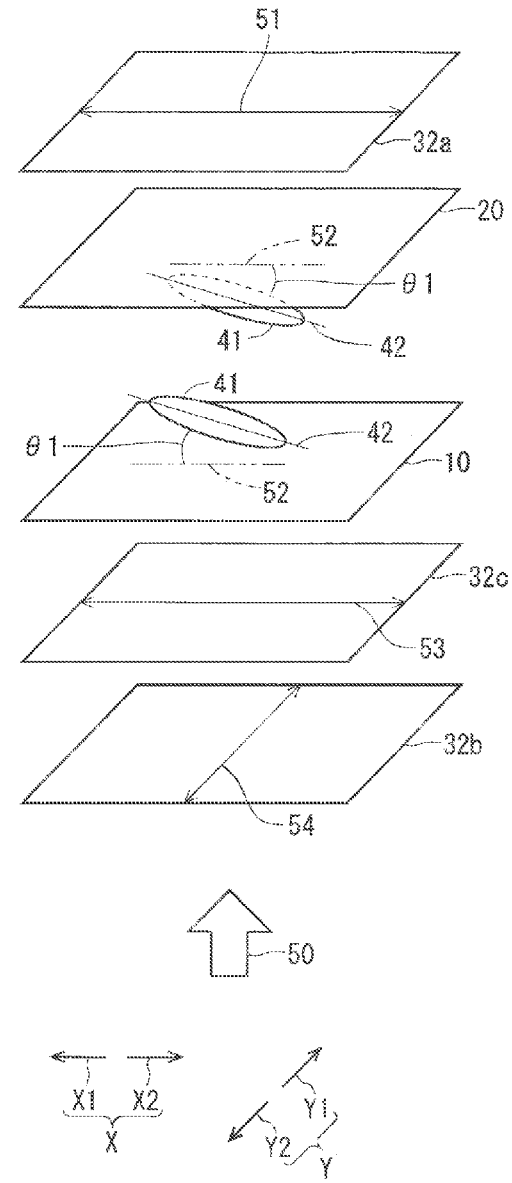
FIG. 3 shows an example of arrangement of optical components of a liquid crystal panel according to a prerequisite technique.

FIG. 3 shows an example of arrangement of optical components of a liquid crystal panel according to the prerequisite technique. The optical components shown in FIG. 3 include the counter substrate polarizing plate 32a, the array substrate polarizing plate 32b, and the biaxial phase difference film 32c.

The counter substrate polarizing plate 32a is arranged such that an absorption axis 51 forms an angle of 0° relative to the direction X, specifically such that the absorption axis 51 becomes parallel to the direction X1. The array substrate polarizing plate 32b is arranged such that an absorption axis 54 forms an angle of 90° relative to the direction X, specifically such that the absorption axis 54 becomes perpendicular to the direction X.

Backlighting light enters from a direction of an arrow 50 that is a direction perpendicular to the external surface of the array substrate polarizing plate 32b. Specifically, the incident direction 50 of backlighting light is perpendicular to the directions X and Y.

An alignment direction of a liquid crystal molecule 41 corresponds to a direction of an alignment axis 52 of the liquid crystal molecule 41. In the first preferred embodiment, the alignment direction of the liquid crystal molecule 41 is set at an angle of 0° relative to the direction X, specifically set to be parallel to the direction X. A pretilt angle θ1 of the liquid crystal molecule 41 on the side of the array substrate 10 is set such that the liquid crystal molecule 41 goes away from the array substrate 10 in the direction X1 at the 9 o'clock position. The pretilt angle θ1 of the liquid crystal molecule 41 on the side of the counter substrate 20 is set such that the liquid crystal molecule 41 goes away from the counter substrate 20 in the direction X2 at the 3 o'clock position.

The "alignment direction" mentioned herein is a direction of alignment process such as rubbing performed on the alignment films 22a and 22b. The "pretilt angle" mentioned herein is an angle a long axis 42 of each liquid crystal molecule 41 forms relative to a surface of the array substrate 10 or the counter substrate 20 facing the liquid crystal layer 40 if no voltage is applied to the liquid crystal layer 40.

In the liquid crystal panel having the pretilt angle set in the aforementioned way, the biaxial phase difference film 32*c* is used for enhancing viewing angle characteristics. According to the prerequisite technique, the biaxial phase difference film 32*c* is arranged so as to achieve maximum contrast if the liquid crystal panel is viewed from the front while a viewing direction of the liquid crystal panel has no particular directivity.

More specifically, as shown in FIG. 3, the biaxial phase difference film 32*c* is arranged such that a delay phase axis 53 of the biaxial phase difference film 32*c* extends in a direction parallel to the alignment direction of the liquid crystal molecule 41, specifically in a direction at an angle of 0° relative to the direction X in a plan view taken from a direction perpendicular to a substrate surface of the liquid crystal panel and opposite the incident direction 50 of backlighting light.

In contrast, in the first preferred embodiment, the biaxial phase difference film 32*c* is arranged such that the delay phase axis 53 of the biaxial phase difference film 32*c* extends in a direction that achieves maximum contrast if the liquid crystal panel is viewed from a position shifted from the front. More specifically, the biaxial phase difference film 32*c* is arranged as shown in FIGS. 4 and 5.

FIG. 4 is a plan view showing an example of the position of the array substrate 10 and that of the liquid crystal molecule 41 relative to each other in the first preferred embodiment of the present invention. FIG. 5 shows an example of arrangement of the optical components of the liquid crystal panel 1 according to the first preferred embodiment of the present invention.

In the first preferred embodiment, the counter electrode 13 as the slit electrode of the array substrate 10 is formed such that the slit portion of the slit electrode extends in a direction forming an angle exceeding 0° and not exceeding 15° relative to the direction X corresponding to the horizontal direction of the liquid crystal panel 1. More specifically, the counter electrode 13 is arranged such that its slit portion becomes vertically symmetric about the center of the pixel electrode 12 as an axis of symmetry.

The liquid crystal molecule 41 is aligned in a direction parallel to a direction 60 at an angle of 0° corresponding to the horizontal direction of the liquid crystal panel 1. Like the liquid crystal panel of the prerequisite technique, the liquid crystal panel 1 of the first preferred embodiment is a liquid crystal panel of an FFS mode adopting an optical compensating method using the biaxial phase difference film 32*c*.

Thus, like in the aforementioned case described by referring to FIG. 3, the pretilt angle θ1 of the liquid crystal molecule 41 on the side of the array substrate 10 is set such that the liquid crystal molecule 41 goes away from the array substrate 10 in the direction X1 at the 9 o'clock position. The pretilt angle θ1 of the liquid crystal molecule 41 on the side of the counter substrate 20 is set such that the liquid crystal molecule 41 goes away from the counter substrate 20 in the direction X2 at the 3 o'clock position.

In the liquid crystal panel 1 having the pretilt angle set in the aforementioned way, according to the first preferred embodiment, a certain shift angle θ2 is set such that the direction of the delay phase axis 53 of the biaxial phase difference film 32*c* is shifted anticlockwise in an angular range from over 0° to 1° from the direction X corresponding to the direction of 0° as shown in FIG. 5. Specifically, the direction of the delay phase axis 53 of the biaxial phase difference film 32*c* is arranged in a position rotated anticlockwise in the angular range from over 0° to 1° from the direction X corresponding to the horizontal direction of the liquid crystal panel 1 in use.

The "shift angle θ2" mentioned herein is an angle of shift of the delay phase axis 53 of the biaxial phase difference film 32*c* from the direction X and showing an angle between the delay phase axis 53 of the biaxial phase difference film 32*c* and the direction X.

The absorption axes 51 and 54 of the polarizing plates 32*a* and 32*b* respectively are set in the same way as in the aforementioned prerequisite technique described by referring to FIG. 3. More specifically, the absorption axis 51 of the counter substrate polarizing plate 32*a* is arranged in a direction of an angle of 0°, specifically in a direction parallel to the direction X corresponding to the alignment direction of the liquid crystal molecule 41 in a plan view. The absorption axis 54 of the array substrate polarizing plate 32*b* is arranged in a direction of an angle of 90°, specifically in a direction perpendicular to the direction X corresponding to the alignment direction of the liquid crystal molecule 41 in a plan view.

In the first preferred embodiment, the biaxial phase difference film 32*c* and the polarizing plates 32*a* and 32*b* are arranged such that the respective end sides of the outer shapes thereof as they are become parallel to respective end surfaces of the glass substrates 11 and 21 forming the array substrate 10 and the counter substrate 20 respectively. Specifically, in the first preferred embodiment, only the direction of the delay phase axis 53 of the biaxial phase difference film 32*c* is shifted from the respective end sides of the outer shapes of the biaxial phase difference film 32*c* and the polarizing plates 32*a* and 32*b*.

Thus, while the polarizing plates 32*a* and 32*b* and the biaxial phase difference film 32*c* are bonded at respective angles same as those in the prerequisite technique and the respective end sides of the outer shapes of the biaxial phase difference film 32*c* and the polarizing plates 32*a* and 32*b* are parallel to the respective end surfaces of the glass substrates 11 and 21, the delay phase axis 53 of the biaxial phase difference film 32*c* can be set at an angle tilted from the direction X corresponding to the direction of the alignment axis 52 of the liquid crystal molecule 41.

Unlike in the first preferred embodiment, if the pretilt angle θ1 is set in a way opposite to the way shown in FIG. 5, the orientation of the delay phase axis 53 of the biaxial phase difference film 32*c* is also set in a way opposite to the way shown in FIG. 5. More specifically, in this case, the pretilt angle θ1 of the liquid crystal molecule 41 on the side of the array substrate 10 is set such that the liquid crystal molecule 41 goes away from the array substrate 10 in the direction X2 at the 3 o'clock position. The pretilt angle θ1 of the liquid crystal molecule 41 on the side of the counter substrate 20 is set such that the liquid crystal molecule 41 goes away from the counter substrate 20 in the direction X1 at the 9 o'clock position.

In a liquid crystal panel having this pretilt angle, the certain shift angle θ2 is set in a way opposite to the way shown in FIG. 5 such that the direction of the delay phase axis 53 of the biaxial phase difference film 32*c* is shifted clockwise in an angular range from over 0° to 1° from the direction X corresponding to the direction of 0°. Specifically, the direction of the delay phase axis 53 of the biaxial phase difference film 32*c* is arranged in a position rotated clockwise in the angular range from over 0° to 1° from the direction X.

According to the aforementioned optical design of the prerequisite technique such as that shown in FIG. 3, contrast becomes highest when the liquid crystal panel is viewed from the front, specifically viewed in a direction perpendicular to the front of the liquid crystal panel or to the display surface of the liquid crystal panel and a direction near the perpendicular direction. Contrast obtained in the direction Y including the upward and downward directions becomes symmetric relative to a center line.

In contrast, according to the first preferred embodiment, the certain shift angle θ2 is set such that the direction of the delay phase axis 53 of the biaxial phase difference film 32c is shifted anticlockwise in an angular range from over 0° to 1° from the direction X corresponding to the direction of 0° as shown in FIG. 5. This optical design allows the liquid crystal panel 1 to achieve the highest contrast when the liquid crystal panel 1 is viewed from above relative to the display surface, specifically viewed in the direction Y1.

Figure 6:
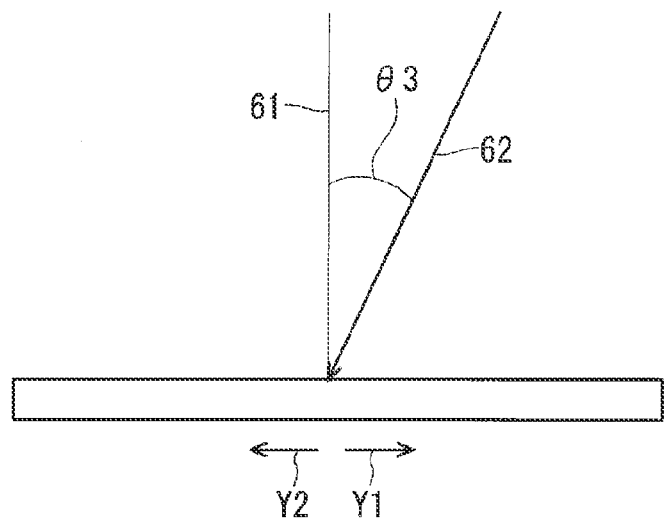
FIG. 6 explains a polar angle θ3.
Figure 7:
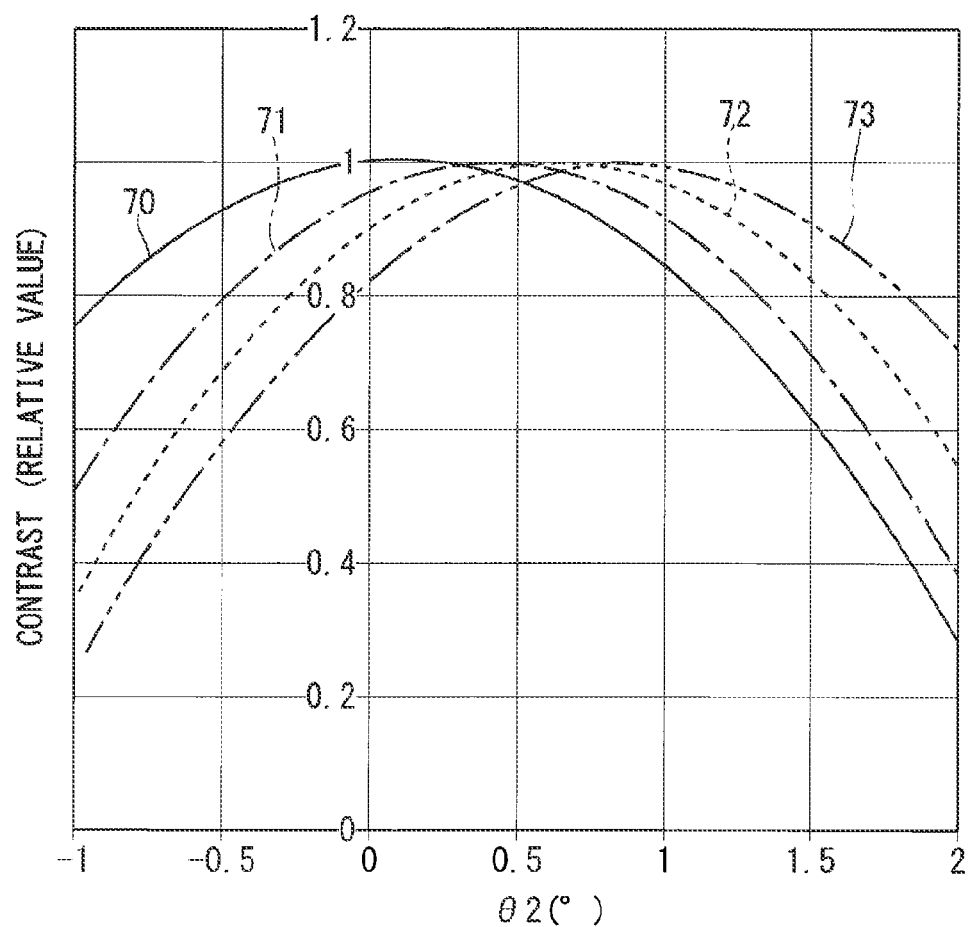
FIG. 7 is a graph showing a relationship between an angle θ2 of a delay phase axis 53 of a biaxial phase difference film 32c to a direction X and a contrast value determined in a direction of the polar angle θ3 at an azimuth of 90°.

FIG. 6 explains a polar angle θ3. FIG. 7 is a graph showing a relationship between the angle θ2 of the delay phase axis 53 of the biaxial phase difference film 32c to the direction X and a contrast value determined in a direction of the polar angle θ3 at an azimuth of 90°. The horizontal axis of FIG. 7 shows the angle θ2 (°) between the delay phase axis 53 and the direction X. The vertical axis of FIG. 7 shows contrast (relative value). FIG. 7 shows a result of calculation of a contrast value at a corresponding polar angle θ3 obtained by changing the angle θ2 between the delay phase axis 53 of the biaxial phase difference film 32c and the direction X. The contrast value was calculated using a simulator "LCD master" available from SHINTECH, Inc.

The polar angle θ3 mentioned herein is an angle between a direction 61 perpendicular to the directions Y1 and Y2 corresponding to the upward and downward directions relative to the display surface of the liquid crystal panel 1, specifically the direction 61 perpendicular to the display surface of the liquid crystal panel 1 and a viewing direction 62. The azimuth mentioned herein is an angle relative to the direction X parallel to the display surface of the liquid crystal panel 1 and perpendicular to the directions Y1 and Y2. The direction X is perpendicular to the plane of the sheet of FIG. 6. Thus, a direction at the azimuth of 90° becomes parallel to the plane of the sheet of FIG. 6, specifically parallel to the directions Y1 and Y2.

FIG. 7 shows a calculation result indicated by a reference sign "70" obtained with the polar angle θ3 of 0°, specifically obtained when the liquid crystal panel 1 is viewed from the front. FIG. 7 further shows a calculation result indicated by a reference sign "71" obtained with the polar angle θ3 of 10°, a calculation result indicated by a reference sign "72" obtained with the polar angle θ3 of 20°, and a calculation result indicated by a reference sign "73" obtained with the polar angle θ3 of 30°.

Advantageous effects achieved by the structure of the first preferred embodiment are described by referring to FIG. 7. The calculation results given in FIG. 7 show that setting the shift angle θ2 of the delay phase axis 53 of the biaxial phase difference film 32c in an angular range from over 0° to 1° as in the first preferred embodiment makes it possible to finely adjust and optimize viewing angle characteristics so as to achieve maximum contrast in a range of the polar angle θ3 from over 0° to 30° optimum for a liquid crystal display device to be installed on a vehicle.

The biaxial phase difference film 32c is biaxially stretched to generate a phase difference during a step of manufacturing the same. During the step, a bowing phenomenon may occur to cause a deviation of about ±1.0° from an intended angle in the delay phase axis 53 of the biaxial phase difference film 32c. The "bowing phenomenon" mentioned herein is a phenomenon where a film being manufactured by biaxial stretching process is deformed faster or slower in a central portion of the width direction of the film than in an end portion of the width direction.

According to the aforementioned optical design of the prerequisite technique shown in FIG. 3, if the delay phase axis 53 of the biaxial phase difference film 32c is shifted toward a negative side, the polar angle θ3 becomes negative, specifically contrast becomes maximum when a liquid crystal panel is viewed from below. This degrades the visibility of a liquid crystal display device to be installed on a vehicle.

In contrast, in the first preferred embodiment, the delay phase axis 53 of the biaxial phase difference film 32c is placed on a positive side in advance as shown in FIG. 5 referred to previously. This can prevent the shift angle θ2 of the delay phase axis 53 from becoming a negative angle, even if the delay phase axis 53 of the biaxial phase difference film 32c is shifted toward a negative side due to manufacturing variations. This can prevent a situation where contrast becomes maximum when the liquid crystal panel 1 is viewed from below.

<Second Preferred Embodiment>

Figure 8:
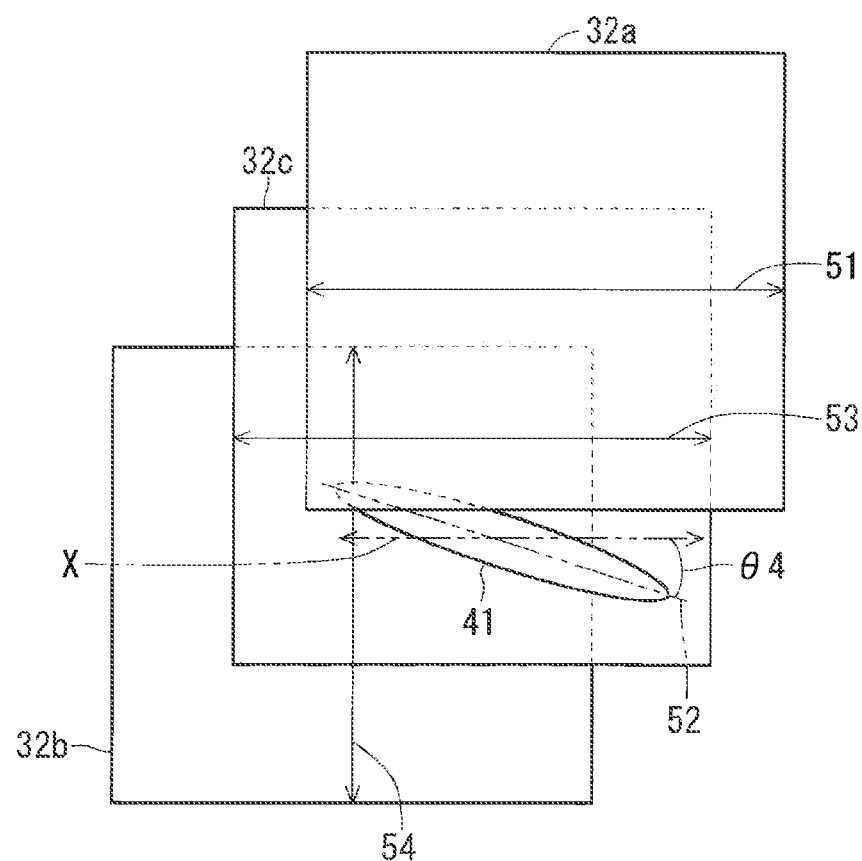
FIG. 8 shows an example of arrangement of optical components of a liquid crystal panel according to a second preferred embodiment of the present invention.

FIG. 8 shows an example of arrangement of optical components of a liquid crystal panel according to a second preferred embodiment of the present invention. The liquid crystal panel of the second preferred embodiment is similar to that of the first preferred embodiment. A structure same as that of the first preferred embodiment is identified by the same reference sign and description common to these structures will not be given repeatedly. In the second preferred embodiment, the direction of the slit portion of the slit electrode, the alignment direction of the liquid crystal molecule 41, the directions of the absorption axes 51 and 54 of the polarizing plates 32a and 32 respectively, and the direction of the delay phase axis 53 of the biaxial phase difference film 32c are the same as those of the first preferred embodiment. Like in the first preferred embodiment, a slit electrode of the second preferred embodiment is the counter electrode 13.

Like in the first preferred embodiment, the counter electrode 13 as the slit electrode of the array substrate 10 is formed so as to form an angle exceeding 0° and not exceeding 15° relative to the horizontal direction of the liquid crystal panel, specifically to the direction X including the directions to the right and to the left relative to the display surface of the liquid crystal panel as shown in FIG. 4 referred to previously. The liquid crystal molecule 41 is aligned in a direction parallel to the direction X corresponding to the horizontal direction of the liquid crystal panel.

Like in the first preferred embodiment, the liquid crystal panel of the second preferred embodiment is a liquid crystal panel of an FFS mode adopting an optical compensating method using the biaxial phase difference film 32c. Further, as shown in FIG. 3 referred to previously, the pretilt angle θ1 is set such that the liquid crystal molecule 41 goes away from the array substrate 10 in the direction X1 at the 9 o'clock position.

In the liquid crystal panel having the aforementioned pretilt angle, a certain shift angle θ4 is set such that the alignment axis (hereinafter called a "liquid crystal alignment axis" in some cases) 52 of the liquid crystal molecule 41 is shifted clockwise in an angular range from over 0° to 1° from the direction X corresponding to the direction of 0° as shown in FIG. 8. If the pretilt angle θ1 rises in the opposite direction (hereinafter called a "pretilt direction" in some cases), the certain shift angle θ4 is set such that the alignment axis 52 is shifted anticlockwise in an angular range from over 0° to 1° from the direction of 0°.

Alignment process such as rubbing is performed on an alignment film during manufacture while allowing for some variations of less than 1° for the liquid crystal alignment axis 52 to occur during the process. Thus, "setting the certain shift angle" mentioned herein means setting a median of design values. More specifically, an average is managed and set so as to fall within the aforementioned range of the certain shift angle in consideration of the variations to occur during the process.

Like that of the first preferred embodiment, the optical design of the second preferred embodiment such as that shown in FIG. 8 allows the liquid crystal panel to achieve the highest contrast when the liquid crystal panel is viewed from above as in the first preferred embodiment.

FIG. 9 is a graph showing a relationship between the angle θ4 of the alignment axis 52 of the liquid crystal molecule 41 to the direction X and a contrast value determined in a direction of the polar angle θ3 at the azimuth of 90°. The horizontal axis of FIG. 9 shows the shift angle θ4(°) corresponding to the angle between the alignment axis 52 of the liquid crystal molecule 41 and the direction X. The vertical axis of FIG. 9 shows contrast (relative value). FIG. 9 shows a result of calculation of a contrast value at a corresponding polar angle θ3 obtained by changing the angle between the alignment axis 52 of the liquid crystal molecule 41 and the direction X. Like in the case of FIG. 7 referred to previously, the contrast value was calculated using a simulator "LCD master" available from SHINTECH, Inc.

FIG. 9 shows a calculation result indicated by a reference sign "80" obtained with the polar angle θ3 of 0°, specifically obtained when the liquid crystal panel 1 is viewed from the front. FIG. 9 further shows a calculation result indicated by a reference sign "81" obtained with the polar angle θ3 of 10°, a calculation result indicated by a reference sign "82" obtained with the polar angle θ3 of 20°, and a calculation result indicated by a reference sign "83" obtained with the polar angle θ3 of 30°.

The calculation results given in FIG. 9 show that by setting the shift angle θ4 of the alignment axis 52 of the liquid crystal molecule 41 to be from 0° to −1° as viewed in the clockwise direction, specifically to be −1° or more and less than 0° as viewed in the anticlockwise direction as a positive direction as in the second preferred embodiment, viewing angle characteristics can be finely adjusted and optimized so as to achieve maximum contrast in a range of the polar angle θ3 from over 0° to 30° optimum for a liquid crystal display device to be installed on a vehicle.

<Third Preferred Embodiment>

Figure 10:
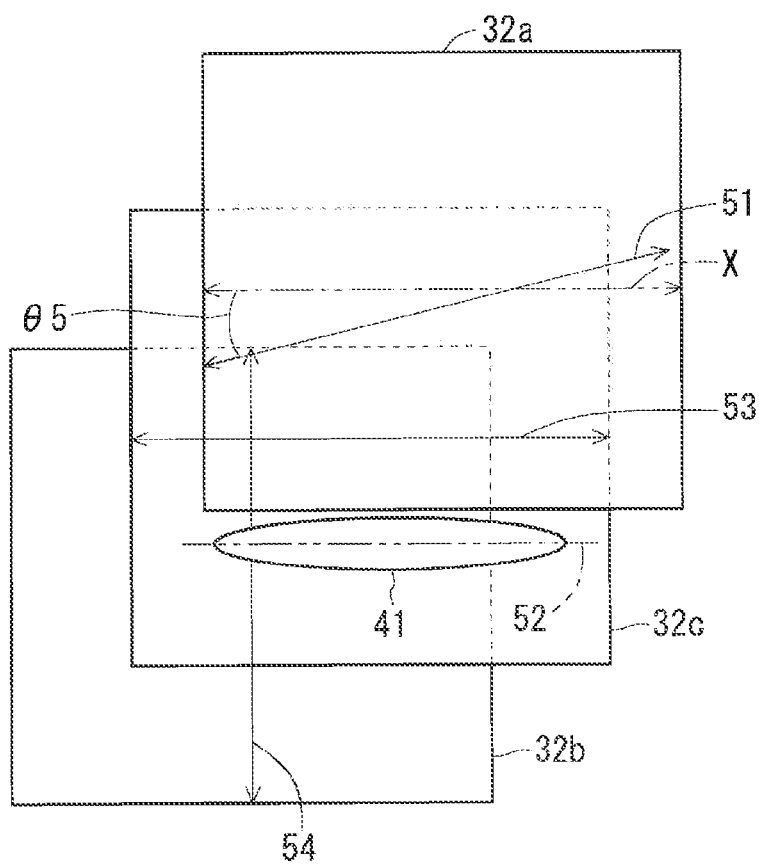
FIG. 10 shows an example of arrangement of optical components of a liquid crystal panel according to a third preferred embodiment of the present invention.

FIG. 10 shows an example of arrangement of optical components of a liquid crystal panel according to a third preferred embodiment of the present invention. The liquid crystal panel of the third preferred embodiment is similar to those of the first and second preferred embodiments. A structure same as that of the first and second preferred embodiments is identified by the same reference sign and description common to these structures will not be given repeatedly. In the third preferred embodiment, a direction of the slit portion of the slit electrode, the alignment direction of the liquid crystal molecule 41, the direction of the absorption axis 54 of the array substrate polarizing plate 32b, and the direction of the delay phase axis 53 of the biaxial phase difference film 32c are the same as those of the first and second preferred embodiments. Like in the first preferred embodiment, a slit electrode of the third preferred embodiment is the counter electrode 13.

Like in the first preferred embodiment, the counter electrode 13 as the slit electrode of the array substrate 10 is formed so as to form an angle exceeding 0° and not exceeding 15° relative to the horizontal direction of the liquid crystal panel, specifically to the direction X including the directions to the right and to the left relative to the display surface of the liquid crystal panel as shown in FIG. 4 referred to previously. The liquid crystal molecule 41 is aligned in a direction parallel to the direction X corresponding to the horizontal direction of the liquid crystal panel.

Like in the first preferred embodiment, the liquid crystal panel of the third preferred embodiment is a liquid crystal panel of an FFS mode adopting an optical compensating method using the biaxial phase difference film 32c. Further, as shown in FIG. 3 referred to previously, the pretilt angle θ1 is set such that the liquid crystal molecule 41 goes away from the array substrate 10 in the direction X1 at the 9 o'clock position.

In the liquid crystal panel having the aforementioned pretilt angle, a certain shift angle θ5 is set such that the absorption axis 51 of the counter substrate polarizing plate 32a is shifted anticlockwise in an angular range from over 0° to 1° from the direction X corresponding to the direction of 0° as shown in FIG. 10. If the pretilt direction is the opposite direction, the certain shift angle θ5 is set such that the absorption axis 51 of the counter substrate polarizing plate 32a is shifted clockwise in an angular range from over 0° to 1° from the direction X corresponding to the direction of 0°.

In the third preferred embodiment, an end side of the outer shape of the counter substrate polarizing plate 32a is set such that this end side as it is becomes parallel to an end surface of the glass substrate 21 while only the absorption axis 51 of the counter substrate polarizing plate 32a is shifted from the end side of the outer shape of the counter substrate polarizing plate 32a. As a result, while the counter substrate polarizing plate 32a is bonded at an angle that makes the end side of the outer shape of the counter substrate polarizing plate 32a parallel to the end surface of the glass substrate 21 as in the prerequisite technique, the direction of the absorption axis 51 of the counter substrate polarizing plate 32a can be set at an angle tilted from the alignment direction of the liquid crystal molecule 41.

Like those of the first and second preferred embodiments, the optical design of the third preferred embodiment such as that shown in FIG. 10 allows the liquid crystal panel to achieve the highest contrast when the liquid crystal panel is viewed from above.

FIG. 11 is a graph showing a relationship between the angle θ5 of the absorption axis 51 of the counter substrate polarizing plate 32a to the direction X and a contrast value determined in a direction of the polar angle θ3 at the azimuth of 90°. The horizontal axis of FIG. 11 shows the shift angle θ5(°) corresponding to the angle between the absorption axis 51 of the counter substrate polarizing plate 32a and the direction X. The vertical axis of FIG. 11 shows contrast (relative value). FIG. 11 shows a result of calculation of a contrast value at a corresponding polar angle θ3 obtained by changing the angle between the absorption axis 51 of the counter substrate polarizing plate 32a and the direction X. Like in the cases of FIGS. 7 and 9 referred to previously, the contrast value was calculated using a simulator "LCD master" available from SHINTECH, Inc.

FIG. 11 shows a calculation result indicated by a reference sign "90" obtained with the polar angle θ3 of 0°, specifically obtained when the liquid crystal panel 1 is viewed from the front. FIG. 11 further shows a calculation result indicated by a reference sign "91" obtained with the polar angle θ3 of 10°, a calculation result indicated by a reference sign "92" obtained with the polar angle θ3 of 20°, and a calculation result indicated by a reference sign "93" obtained with the polar angle θ3 of 30°.

The calculation results given in FIG. 11 show that setting the shift angle θ5 of the absorption axis 51 of the counter substrate polarizing plate 32a in an angular range from over 0° to 1° as viewed in the anticlockwise direction as in the third preferred embodiment makes it possible to finely adjust and optimize viewing angle characteristics so as to achieve maximum contrast in a range of the polar angle θ3 from over 0° to 30° optimum for a liquid crystal display device to be installed on a vehicle.

During manufacture of a liquid crystal display device including a polarizing plate or a biaxial phase difference film having an optical axis (delay phase axis or absorption axis) at a shifted angle of the first and third preferred embodiments, a liquid crystal panel having an optical axis set at a certain angle shifted from a liquid crystal cell can be obtained with better reproducibility as follows in consideration of variations in the angle of the optical axis to be caused during manufacture of the polarizing plate and the biaxial phase difference film.

More specifically, an end side of the outer shape of the biaxial phase difference film 32c like a quadrilateral sheet is given the aforementioned certain shift angle and the direction of the optical axis of the first preferred embodiment. In a step of bonding the polarizing plate and the biaxial phase difference film to the liquid crystal cell to form the liquid crystal panel, the polarizing plate and the biaxial phase difference film like quadrilateral sheets are aligned and bonded such that respective end sides of the outer shapes of the polarizing plate and the biaxial phase difference film become parallel as accurately as possible to an end side of the outer shape of a quadrilateral substrate of the liquid crystal cell. This can easily place the optical axis at a certain angle shifted from the liquid crystal cell.

The following describes an example of a particular method of preparing the polarizing plate and the biaxial phase difference film like quadrilateral sheets each having an optical axis given a certain shift angle and a direction, specifically an optical axis shifted in advance from the end side of the outer shape of a corresponding one of the polarizing plate and the biaxial phase difference film. In a step of cutting the respective outer shapes of the polarizing plate and the biaxial phase difference film, the polarizing plate and the biaxial phase difference film are each arranged at an angle satisfying a particular optical condition while optical measurement is made with a reference optical sheet having an optical axis in an accurately specified direction. As a result, the direction of the optical axis of each of the polarizing plate and the biaxial phase difference film before the cutting is specified accurately. Then, each the polarizing plate and the biaxial phase difference film member is cut such that the end side thereof is placed at the certain angle shifted from the specified direction of its optical axis. As a result, the polarizing plate and the biaxial phase difference film member each having an intended shift angle can be manufactured.

It is preferable that an alignment mark be formed on a protection sheet for the polarizing plate, for example. Like in the aforementioned cutting of the polarizing plate, when the alignment mark is to be formed, the direction of the optical axis of each of the polarizing plate and the biaxial phase difference film material is specified accurately. Then, the alignment mark is arranged in a position opposite to the specified direction of the optical axis in terms of a certain shift angle and a direction.

Like in the case where the end side of the outer shape of each of the polarizing plate and the biaxial phase difference film is used as a reference, the polarizing plate and the biaxial phase difference film may be aligned and bonded using the shifted alignment mark as a reference such that the respective end sides of the outer shapes of the polarizing plate and the biaxial phase difference film become parallel as accurately as possible to the end side of the outer shape of the quadrilateral substrate of the liquid crystal cell.

The preferred embodiments of the present invention can be combined freely within the scope of the invention. Further, any component of each of the preferred embodiments can be changed or omitted, where appropriate.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal panel comprising an array substrate, a counter substrate arranged to face said array substrate, and a liquid crystal layer interposed between said array substrate and said counter substrate, said array substrate including multiple switching elements arranged in a matrix, a pixel electrode connected to said switching elements, and a counter electrode capable of forming a fringe electric field between said counter electrode and said pixel electrode, said switching elements, said pixel electrode, and said counter electrode being provided on an insulating substrate, wherein
one of said pixel electrode and said counter electrode is formed as a slit electrode having a slit portion and the other of said pixel electrode and said counter electrode is stacked over said slit electrode at said insulating substrate side with respect to said slit electrode with an insulating film interposed therebetween,
said array substrate includes a biaxial phase difference film and an array substrate polarizing plate arranged in this order on a surface of said insulating substrate opposite a side thereof facing said liquid crystal layer,
said counter substrate includes a counter substrate polarizing plate arranged on a side of said counter substrate opposite a side thereof facing said liquid crystal layer,
said slit portion of said slit electrode extends in a direction forming an angle exceeding 0° and not exceeding 15° relative to a horizontal direction of said liquid crystal panel in use,
a pretilt angle of a liquid crystal molecule forming said liquid crystal layer on the side of said array substrate is formed such that said liquid crystal molecule goes away from said array substrate in a direction to the left when viewed from a position facing a display surface of said liquid crystal panel, said direction to the left defining said horizontal direction, and said pretilt angle on the side of said counter substrate is formed such that said liquid crystal molecule goes away from said counter substrate in a direction to the right when viewed from a position facing said display surface of said liquid crystal panel, said direction to the right defining said horizontal direction, and
one of a direction of a delay phase axis of said biaxial phase difference film and a direction of an absorption axis of said array substrate polarizing plate is arranged in a position rotated anticlockwise in an angular range from over 0° to 1° from said horizontal direction or one of a direction of an absorption axis of said counter substrate polarizing plate and an alignment direction of said liquid crystal molecule is arranged in a position rotated clockwise in an angular range from over 0° to 1° from said horizontal direction.

2. The liquid crystal panel according to claim 1, wherein said insulating substrate, said biaxial phase difference film, said array substrate polarizing plate, and said counter substrate polarizing plate are each formed into a quadrilateral configuration, and each of said biaxial phase difference film, said array substrate polarizing plate, and said counter substrate polarizing plate has at least one end side of an outer shape thereof arranged parallel to at least one end side of an outer shape of said insulating substrate.

3. A liquid crystal display device comprising:
the liquid crystal panel as recited in claim 1; and
an illumination unit to illuminate said liquid crystal panel.

4. A method of manufacturing a liquid crystal panel comprising an array substrate, a counter substrate arranged to face said array substrate, and a liquid crystal layer interposed between said array substrate and said counter substrate, said array substrate including multiple switching elements arranged in a matrix, a pixel electrode connected to said switching elements, and a counter electrode capable of forming a fringe electric field between said counter electrode and said pixel electrode, said switching elements, said pixel electrode, and said counter electrode being provided on an insulating substrate,
the method comprising the steps of:
forming one of said pixel electrode and said counter electrode as a slit electrode having a slit portion and stacking the other of said pixel electrode and said counter electrode over said slit electrode at said insulating substrate side with respect to said slit electrode interposing an insulating film therebetween;
providing a biaxial phase difference film and an array substrate polarizing plate in this order on a surface of said insulating substrate of said array substrate opposite a side thereof facing said liquid crystal layer;
providing a counter substrate polarizing plate on a side of said counter substrate opposite a side thereof facing said liquid crystal layer;
forming said slit electrode such that said slit portion extends in a direction forming an angle exceeding 0° and not exceeding 15° relative to a horizontal direction of said liquid crystal panel in use;
setting a pretilt angle of a liquid crystal molecule forming said liquid crystal layer on the side of said array substrate such that said liquid crystal molecule goes away from said array substrate in a direction to the left when viewed from a position facing a display surface of said liquid crystal panel, said direction to the left defining said horizontal direction, and setting said pretilt angle on the side of said counter substrate such that said liquid crystal molecule goes away from said counter substrate in a direction to the right when viewed from a position facing said display surface of said liquid crystal panel, said direction to the right defining said horizontal direction; and
arranging one of a direction of a delay phase axis of said biaxial phase difference film and a direction of an absorption axis of said array substrate polarizing plate in a position rotated anticlockwise in an angular range from over 0° to 1° from said horizontal direction or arranging one of a direction of an absorption axis of said counter substrate polarizing plate and an alignment direction of said liquid crystal molecule in a position rotated clockwise in an angular range from over 0° to 1° from said horizontal direction.

5. The method of manufacturing a liquid crystal panel according to claim 4, wherein
said insulating substrate, said biaxial phase difference film, said array substrate polarizing plate, and said counter substrate polarizing plate are each formed into a quadrilateral configuration, and
each of said biaxial phase difference film, said array substrate polarizing plate, and said counter substrate polarizing plate is aligned such that at least one end side of an outer shape of each of said biaxial phase difference film, said array substrate polarizing plate, and said counter substrate polarizing plate becomes parallel to at least one end side of an outer shape of said insulating substrate.

6. The method of manufacturing a liquid crystal panel according to claim 4, wherein
an alignment mark is formed in a position opposite to a position where one of said direction of said delay phase axis of said biaxial phase difference film and said direction of said absorption axis of said array substrate polarizing plate is to be arranged or opposite to a position where one of said direction of said absorption axis of said counter substrate polarizing plate and said alignment direction of said liquid crystal molecule is to be arranged, and
each of said biaxial phase difference film, said array substrate polarizing plate, and said counter substrate polarizing plate is aligned such that said alignment mark becomes parallel to at least one end side of an outer shape of said insulating substrate.

* * * * *